Figure 1:
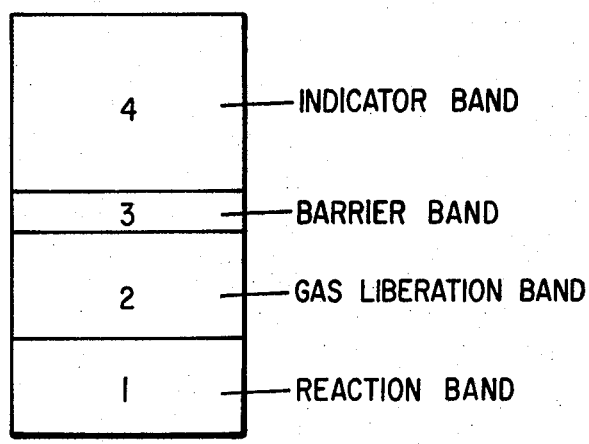

May 3, 1966  A. L. BABSON  3,249,513
PURIFICATION OF UREASE
Filed Sept. 19, 1963

INVENTOR.
ARTHUR BABSON
BY
ATTORNEY

# United States Patent Office 3,249,513
Patented May 3, 1966

3,249,513
PURIFICATION OF UREASE
Arthur L. Babson, Morris Plains, N.J., assignor to Warner-Lambert Pharmaceutical Company, Morris Plains, N.J., a corporation of Delaware
Filed Sept. 19, 1963, Ser. No. 310,062
5 Claims. (Cl. 195—66)

This invention relates to a new and improved process for the separation and purification of urease enzyme and especially for use in diagnostic procedures. More particularly, the present invention relates to a new and improved method for the production of urease by dialysis procedures. The urease so obtained is particularly suitable for use in reactions which involve the quantitative determination in body fluids such as blood, urine and the like for urea. The quantitative determination for urea is important since it is present in abnormal amounts in certain pathological conditions.

The detection of various substances in body fluids by diagnostic procedures involving biochemical reactions has long been known. The determination of these biochemical substances may involve a primary reaction in which the biochemical substance reacts to form a color and the measurement is carried out by comparatively simple colorimetric comparisons. Other methods involve a secondary reaction in which the body fluids are treated with a certain reagent or reagent system and the determination is made thereafter by measuring one or more of the secondary reaction products formed. An example of the latter is the measurement of blood urea nitrogen levels in blood serum by conversion of the urea nitrogen to ammonia and thereafter measuring the amount of ammonia evolved. Measurement of the blood urea nitrogen level is an important diagnostic procedure since elevated serum levels of urea nitrogen are observed in patients who are suffering from uremia, chronic nephritis, severe hemorrhage or small intestinal obstructions.

Since early detection and the accurate determination of abnormal concentrations of various substances in body fluids is important to be of any value, the assay must not only be rapid and convenient but simple enough for a technician to learn with ease. The results must also be sufficiently accurate to serve the clinician and sufficiently sensitive to reflect variations in the patient's condition. Moreover, the diagnostic aid or reagent which is employed in the test procedure must maintain adequate stability over extended storage periods to be dependable.

It is an object of this invention, therefore, to provide an improved urease for use in diagnostic procedures for the detection and determination of urea in body fluids. It is also an object of this invention to provide improved urease enzyme having enhanced stability.

It is another object of this invention to provide a method for measuring quantitatively the amount of urea present in body fluids such as blood, urine and the like which involves a chemical reaction with urease to form a measurable amount of ammonia.

Other objects and advantages of this invention will appear hereinafter.

The aforesaid objects are obtained in accordance with this invention by employing highly purified urease enzyme in a diagnostic composition, which urease is prepared by a novel dialysis method as hereinafter described. The improved and highly purified urease enzyme is preferably used in combination with a carrier such as a piece of bibulous material and the latter being impregnated in such a way with the urease as to provide a chemical reagent system which produces a measurable amount of gaseous ammonia from the urea present in the test system being measured. The reagent system may further be provided with an indicator sensitive to the ammonia so produced so as to change colors to a degree proportional to the amount of urea present in the body fluid under test. In accordance with the embodiment of this invention, use of such an indicator in the form of a strip of bibulous material merely involves insertion of the strip of bibulous material into a tube containing a relatively small but measured volume of body fluid to be tested and thereafter comparing the colored area produced on the ammonia sensitive indicator to a standardized color chart after color development has proceeded for a definite and predetermined time interval.

The urease enzyme is found in legumes such as jack beans, soybeans and the like. The enzyme may be found in jack bean to the extent of about 0.12% by weight and in soybean to the extent of about 0.01% by weight and while it may be extracted from the legume with an organic solvent such as acetone and the like, this procedure produces an enzyme having limited stability.

In accordance with the present invention, a more effective and stable urease enzyme is obtained when the legume is reduced to a meal, the meal extracted with an aqueous solution and the aqueous extract dialyzed against an aqueous buffer. The dialyzed extract is found to contain urease which has a low initial ammonia concentration which is observed to increase only very slowly upon storage. Urease extract obtained by this dialysis procedure is found to be remarkably stable in solution and retains about 90% of its original activity even after standing for periods up to about five weeks and longer. Further, the stability of the urease produced by the present process does not require the addition of stabilizing agents such as ascorbic acid, glycine, potassium thiocyanate and the like, to be of satisfactory stability.

The enzymatic activity of urease may be determined by the procedure of J. B. Sumner and D. B. Hand, J. Biol., Chem. 76, 149 (1928). Tested by this procedure the dialyzed urease as produced herein is found to have several times the activity of the urease now commercially available.

The purified urease solution produced by the dialysis step may thereafter be lyophilized or the water present therein may be separated by spray-drying to form a powder for use in dry form or incorporated into tablets or for application on a bibulous material to serve as a source of urease in any of a number of known diagnostic procedures requiring this enzyme. The bibulous materials usefully employed herein may be any form of porous, absorbent sheet material which is insoluble in water or organic solvents such as paper, cloth, wood shavings and the like. It is important that the bibuous material absorb and hold the liquids which may be applied to it; that it maintain satisfactory wet strength and that it be nonreactive in the presence of the various reagents applied thereto or in combination with the body fluids to be tested. An absorbent paper is a highly effective form of bibulous material for use in the present invention. A thickness of from about 0.1 to about 1 millimeter is satisfactory. The strip should have a suitable length and width to permit impregnation with bands of the various reagents and yet be small enough to fit into the test tubes in which the test procedure is carried out. A strip of Eaton-Dikeman 627 paper having a length of about 2½ to about 4 inches, a width of about ⅛ to about ½ inch and a thickness of about 0.1 to about 0.4 mm. is effective.

The purified and stabilized urease prepared by the present invention is a source of stable urease useful in several of the known methods for the determination of urea nitrogen, such as those described in Folin and Svedberg, J. Biol. Chem. 88:77, 1939; Van Slyke and Cullen, J. Biol. Chem. 24:177, 1916; Karr, J. Lab. Clin. Med. 9:3, 1924.

Figure 2:
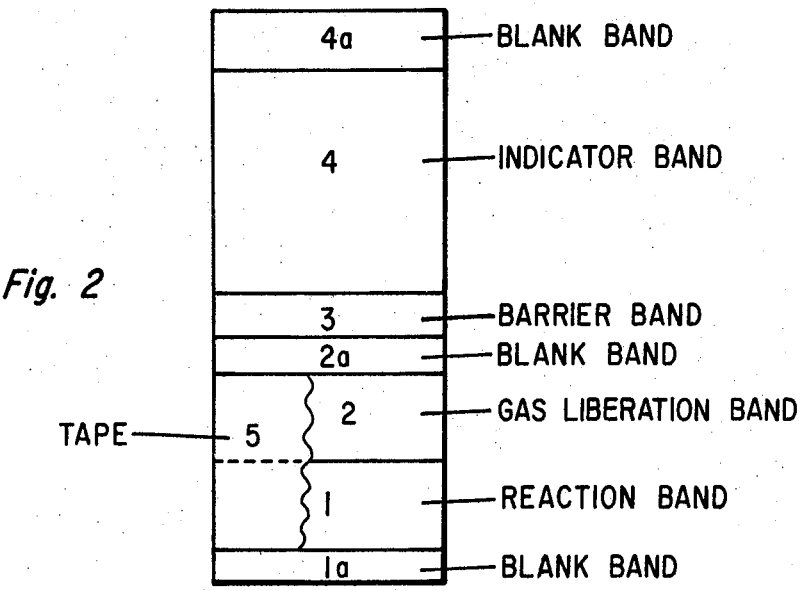

In the accompanying drawing, greatly enlarged, FIGS. 1 and 2 illustrate the construction of an embodiment of the present invention showing an indicator strip suitable for use as a carrying medium for the improved urease of the present invention.

The improved urease of the present invention may be used to impregnate an indicator strip as shown in FIGS. 1 and 2 of the drawing. The general theory of operation of such a strip and the details of construction are described in the patent issued to M. E. Deutsch, U.S. Pat. No. 3,011,874. In the indicator strip disclosed, the dialyzed urease is present in reaction band 1 which is at one end of the strip. Adjacent this reaction band is a gas liberation band 2 separated by barrier band 3 from indicator band 4 adjacent thereto which also extends the width of the strip and contains the color indicator of the strip.

The alternate structure of FIG. 2 also include unimpregnated blank bands, 1a, 2a, and 4a. This embodiment includes a layer of pressure sensitive tape 5, shown partially cut away and so applied as to cover both sides of the strip and the areas occupied by both the reaction band and the gas liberation band.

The reaction band of this trip is the area impregnated with the urease and with a buffer adapted to maintain the pH of the band between 7 and 8 and preferably at about 7.6 when wetted with serum. A phosphate buffer such as a mixture of $K_2HPO_4$ and $KH_2PO_4$ yield the desired pH.

The gas liberation band is impregnated with a basic material which will produce a pH of at least 10 in this area when it is wetted with the reaction mixture which travels up the strip. Suitable basic materials include the alkali metal carbonates and phosphates, such as potassium phosphate, lithium carbonate, sodium carbonate, potassium carbonate, sodium phosphate and the like. Potassium carbonate is a particularly effective basic material.

Barrier band 3 is included in the indicator strip to prevent the migration of liquid up the strip by capillary action. The presence of the barrier insures that any color change in the indicator band is due solely to the gas liberated from the gas liberation band and not due to any of the reagents in other bands in the strip. Any paper impregnants which prevent the capillary flow of the liquid through the paper can be used in creating an effective barrier band. Impregnants which are usefully employed include water insoluble or water impermeable materials such as paint, varnish, enamels, film-forming polymeric compositions and the like.

In accordance with the embodiment of the present invention shown in FIG. 2, a blank or unimpregnated band 2a is provided between gas liberation band 2 and barrier band 3. Addition of this band is desirable to allow escape of gas.

Adjacent the barrier band, is indicator band 4, uniformly impregnated with an acidic substance adapted to chemically neutralize the ammonia evolved from gas liberation band 2. The indicator band contains an indicator substance which changes color within the pH range reached during the ammonia neutralization reaction.

The acidic substances which are useful neutralizing agents in the indicator band include such acids as citric acid, oxalic acid, maleic acid, benzoic acid, sulfosalicylic acid, tartaric acid, and the like. It has been found that there is no absorption of ammonia into paper impregnated with an acidic substance at a pH above about 6.5. Thus the basic indicator employed should have a pH of 6.5 or less. Useful indicators include brom thymol blue, alizarin red S, brom cresol green, methyl red, and the like. An indicator strip where the indicator band is impregnated with tartaric acid and brom cresol green is particularly effective for the measurement of the serum urea nitrogen.

In FIG. 2, a blank or unimpregnated band 4a is provided above the indicator band at the upper portion of the strip to provide an area where the indicator strip can be held without contamination of or interference with the indicator band.

Reaction band 1 and gas liberation band 2 may be covered on both surfaces of the strip with a pressure sensitive gas impermeable tape. A particularly effective tape is Tape No. 478 made by the Minnesota Mining and Manufacturing Company of St. Paul, Minnesota. The use of such a tape covering is particularly desirable for several reasons. First, the tape serves to stiffen the strip at the region where it becomes wet with the body fluid being tested. Without the use of the tape, the strip has a tendency to collapse against the sides of the tube in which the test is carried out, with the possibility that by capillary action the body fluid may not only by-pass the reaction area but may wet the indicator area, thus yielding an erroneous result. Second, the presence of the gas impermeable tape permits the liberation of all the gas from the upper portion of the gas liberation band at a point close to the indicator band thereby improving the accuracy and reproducibility of the result obtained. Finally, the tape acts as a seal to protect the urease enzyme present in the reaction band portion from contact with air and insures a long useful shelf life for the strip.

Although the form of indicator strip shown in the drawing is most desirably used as a carrier for the urease enzyme, other carriers such as small squares of filter paper may also be employed, or the dried urease may be compressed into tablets or used as a powder. The tablets may either be formed entirely of urease or the powder may be combined with inert excipients and inert soluble lubricants. The tablet may be such as to provide any convenient quantity of urease for either a single determination or for the preparation of a quantity sufficient for several determinations.

The following examples further illustrate the practice of the present invention.

*Example 1*

Whole jack beans are finely divided employing a whirling knife blendor and the hulls then removed by passing through a standard No. 30 U.S. sieve. Six hundred grams of this sieved material is slurried with 2200 milliliters of water. The pH of the solution is adjusted to about 7.0 with 2.5 N sodium hydroxide solution and maintained at a pH of about 7.0 by subsequent additions of the sodium hydroxide solution, while stirring for about 15 minutes. The slurry is then centrifuged and the supernatant liquid transferred to a 1 inch diameter cellulose casing. The solution within the membrane is then dialyzed for about two days against an 0.05 M phosphate buffer maintained at a pH of about 7.5. The dialyzed solution within the membrane contains the purified urease and the latter is then recovered from the solution by either lyophilization or spray-drying methods.

*Example 2*

The purified urease solution prepared by the process of Example 1 is used to impregnate sheets of filter paper, the sheets being allowed to absorb as much of the solution as possible and then dried. The dried sheets are then cut into pieces of approximately one centimeter by two centimeters. The dried and impregnated filter paper obtained may then be used as a stable source of urease for a single urea-nitrogen assay.

*Example 3*

The aqueous urease solution obtained after the dialysis step of Example 1 is poured into stainless steel pans and frozen in ½ to 1 inch thick sheets. The water is removed by overnight lyophilization at 50 microns pressure and at a temperature of about 0° F. to about −25° F. The resulting dry powder can be stored for long periods of time without loss in potency. The dry urease can then be used to prepare fresh urease solutions for use in urea-nitrogen assays.

Example 4

The purified urease solution of Example 1 is sprayed at room temperature into a column through which is passing a stream of air heated to a temperature of about 80° C. The solution is broken up into a fine droplet or spray form by being fed to the surface of a 2 inch wheel rotating at 35,000 r.p.m., and the water is evaporated from the droplets by the heated air. The exit temperature of the air leaving the column is about 50° C. The dry urease powder formed is collected from the air stream by means of a suitable cyclone separator and a cloth filter.

Example 5

One part by weight of the dry preparations from Example 3 or 4 is mixed with two parts by weight of an inert excipient such as lactose and with one-half part by weight of an inert soluble lubricant such as "Carbowax" (trademark of the Union Carbide Corporation for polyethylene glycols and methoxy polyethylene glycols). The mixture is then compressed into small tablets weighing about 10-20 milligrams in a standard table press. The formed tablets may then be used as a stable source of urease in urea-nitrogen assays.

It is understood that the foregoing detailed descriptions are given merely by way of illustration and that many variations may be made therein without departing from the spirit of the invention.

What is claimed is:

1. A process for the separation of urease from leguminous material which consists essentially of comminuting the leguminous material to form a meal, slurrying the meal in water with agitation while maintaining the pH of the aqueous slurry at about pH 7.0, separating the solid phase from the aqueous phase and dialyzing the aqueous phase through a cellulose membrane against a dilute aqueous buffer solution maintained at a pH of about 7.5.

2. A process for the separation of urease from luguminous material which consists essentially of comminuting the leguminous material to form a meal, slurrying the meal in water with agitation while maintaining the pH of the aqueous slurry at about pH 7.0 by the addition of an alkali, separating the solid phase from the aqueous phase and dialyzing the aqueous phase through a cellulose membrane against a dilute aqueous phosphate buffer at a pH of about 7.5, and removing the water from the dialyzate.

3. The process of claim 2 wherein the water is removed from the dialyzate by lyophilization.

4. The process of claim 2 wherein the water is removed from the dialyzate by spray drying.

5. A process for the separation of urease from jack bean which consists essentially of comminuting the whole jack bean to form a meal, slurrying the meal in water with agitation while maintaining the pH of the aqueous slurry at about pH 7.0 by the addition of an alkali, separating the solid phase from the aqueous phase and dialyzing the aqueous phase through a cellulose membrane against a dilute aqueous phosphate buffer at a pH of about 7.5.

References Cited by the Examiner

UNITED STATES PATENTS

| | | | |
|---|---|---|---|
| 2,977,287 | 3/1961 | Bloch et al. | 167—73 |
| 2,995,493 | 8/1961 | Douglas et al. | 167—73 |
| 3,011,874 | 12/1961 | Deutch | 23—230 X |

OTHER REFERENCES

Fawcett et al.: Journal of Clinical Pathology (1960), vol. 13, pages 156 to 159.

Hanabusa: C.A. 55, 2484oh (1961).

A. LOUIS MONACELL, *Primary Examiner.*

L. M. SHAPIRO, *Assistant Examiner.*